US008990318B2

(12) United States Patent
Loofbourrow et al.

(10) Patent No.: US 8,990,318 B2
(45) Date of Patent: Mar. 24, 2015

(54) MESSAGE FOCUSING

(75) Inventors: Wayne Loofbourrow, San Jose, CA (US); Yan Arrouye, Los Altos, CA (US)

(73) Assignee: Apple Inc., Cupertino, CA (US)

( * ) Notice: Subject to any disclaimer, the term of this patent is extended or adjusted under 35 U.S.C. 154(b) by 564 days.

(21) Appl. No.: 12/969,549

(22) Filed: Dec. 15, 2010

(65) Prior Publication Data
US 2012/0158856 A1 Jun. 21, 2012

(51) Int. Cl.
G06F 15/16 (2006.01)
H04L 12/58 (2006.01)
G06F 17/30 (2006.01)

(52) U.S. Cl.
CPC ............ H04L 12/588 (2013.01); H04L 12/585 (2013.01); *H04L 12/586* (2013.01); *H04L 51/16* (2013.01); *G06F 17/30038* (2013.01)
USPC ............................ 709/206; 709/204; 709/207

(58) Field of Classification Search
CPC ... H04L 12/588; H04L 12/585; H04L 12/586; H04L 51/16; G06F 17/30038
USPC .......................................... 709/204, 206, 207
See application file for complete search history.

(56) References Cited

U.S. PATENT DOCUMENTS

| | | | |
|---|---|---|---|
| 5,948,058 A * | 9/1999 | Kudoh et al. ................. | 709/206 |
| 6,205,205 B1 | 3/2001 | Goldberg et al. | |
| 6,832,245 B1 * | 12/2004 | Isaacs et al. ................. | 709/206 |
| 6,925,605 B2 | 8/2005 | Bates et al. | |
| 6,993,325 B1 | 1/2006 | Waesterlid | |
| 7,167,910 B2 | 1/2007 | Farnham et al. | |
| 7,945,627 B1 | 5/2011 | Musat | |
| 8,019,051 B1 | 9/2011 | Childs et al. | |
| 8,037,143 B1 | 10/2011 | Atkins et al. | |
| 8,037,169 B2 | 10/2011 | Macnaughton et al. | |
| 8,301,707 B1 * | 10/2012 | Hebb et al. .................... | 709/206 |
| 2003/0167324 A1 | 9/2003 | Farnham et al. | |
| 2005/0060643 A1 * | 3/2005 | Glass et al. ................. | 715/501.1 |
| 2006/0036693 A1 * | 2/2006 | Hulten et al. ................. | 709/206 |
| 2006/0168006 A1 * | 7/2006 | Shannon et al. ............. | 709/206 |
| 2007/0124432 A1 * | 5/2007 | Holtzman et al. ............ | 709/219 |
| 2009/0150514 A1 * | 6/2009 | Davis et al. .................... | 709/217 |
| 2009/0177484 A1 * | 7/2009 | Davis et al. ........................ | 705/1 |
| 2009/0198666 A1 * | 8/2009 | Winston et al. .................... | 707/5 |
| 2009/0210507 A1 * | 8/2009 | Haverkos ....................... | 709/206 |
| 2010/0011071 A1 * | 1/2010 | Zheleva ........................ | 709/206 |
| 2010/0011072 A1 | 1/2010 | Mishchenko | |
| 2010/0030798 A1 * | 2/2010 | Kumar et al. ................. | 707/102 |
| 2010/0235489 A1 * | 9/2010 | Cogan ............................ | 709/224 |
| 2010/0306249 A1 * | 12/2010 | Hill et al. ....................... | 707/769 |

(Continued)

FOREIGN PATENT DOCUMENTS

| | | |
|---|---|---|
| EP | 964343 | 12/1999 |
| JP | 2000347954 | 12/2000 |

*Primary Examiner* — David Lazaro
*Assistant Examiner* — Vitali Korobov
(74) *Attorney, Agent, or Firm* — Blakely, Sokoloff, Taylor & Zafman LLP

(57) ABSTRACT

A method and apparatus of a device that focuses messages is described. In an exemplary method, the device receives a first and second group of message. The device further selects a related message from the second group of messages that is related to each message in the first group. This selecting is based on an affinity group, where the affinity group includes a message address that occurs in at least one of the messages in the second group and the affinity group is determined using the message addresses contained in the first and second groups.

20 Claims, 17 Drawing Sheets

(56) References Cited

U.S. PATENT DOCUMENTS

| | | | |
|---|---|---|---|
| 2011/0010367 A1* | 1/2011 | Jockish et al. | 707/733 |
| 2011/0060821 A1 | 3/2011 | Loizeaux et al. | |
| 2011/0106920 A1* | 5/2011 | Longo | 709/220 |
| 2011/0173173 A1* | 7/2011 | Hall | 707/706 |
| 2011/0212717 A1* | 9/2011 | Rhoads et al. | 455/420 |
| 2011/0282890 A1* | 11/2011 | Griffith | 707/758 |
| 2012/0051657 A1 | 3/2012 | Lamanna et al. | |
| 2012/0303712 A1* | 11/2012 | Polis et al. | 709/204 |

* cited by examiner

MESSAGE FOCUSING

This application is related to co-pending U.S. patent application Ser. No. 12/969,547, filed Dec. 15, 2010, entitled "Data Clustering," and U.S. patent application Ser. No. 12/969,550, filed Dec. 15, 2010, entitled "Message Thread Clustering," which are assigned to a common assignee of the present application and are incorporated by reference.

FIELD OF INVENTION

This invention relates generally to message processing and more particularly to determining affinity groups of message addresses and using the affinity groups to relate messages and threads.

BACKGROUND OF THE INVENTION

A user can communicate using one or more different messaging techniques known in the art: email, instant messaging, social network messaging, cellular phone messages, etc. Typically, the user can accumulate a large collection of messages using one or more of these different messaging techniques. This user collection of messages can be presented as a large collection of messages with limited options of grouping or clustering the messages.

One way of grouping messages is to group multiple emails into an email thread. An email thread is a collection of emails that are related based on the subjects of the emails. For example, one user sends an email to one or more users based on a given subject. Another user replies to that email and a computer would mark those two emails as belonging to a thread. Another way for grouping messages is put the messages into folders. This can be done manually by the user or can be done automatically by the user setting up rules for message processing (e.g., an email from user A goes into a folder designated for user A, an email received by a user where the user is on a carbon copy (CC) list is filed into a CC folder, etc.).

SUMMARY OF THE DESCRIPTION

A method and apparatus of a device that focuses messages is described. In an exemplary method, the device receives a first and second group of message. The device further selects a related message from the second group of messages that is related to each message in the first group. This selecting is based on an affinity group, where the affinity group includes a message address that occurs in at least one of the messages in the second group and the affinity group is determined using the message addresses contained in the first and second groups.

In a further embodiment, the device receives a first and second group of messages, where each of the messages in the first and second group of messages includes a plurality of message addresses. The device further selects a related message from the second group of messages that is related to each message in the first group of messages, where the selecting is based on an affinity group of message addresses. Furthermore, the affinity group includes a message address that occurs in at least one of the messages in the second group and the affinity group is determined using the plurality of message addresses contained in the first and second groups of messages. In addition, the device presents the related message.

In another embodiment, the device receives a plurality of message threads, where each of the plurality of threads includes one or more messages that are related to each of the messages in that thread. For each of the message threads, the device computes a thread signature using affinity groups, where each affinity group is a group of message addresses that related to each other. In addition, the device creates a group of related message threads using the plurality of thread signatures.

Other methods and apparatuses are also described.

BRIEF DESCRIPTION OF THE DRAWINGS

The present invention is illustrated by way of example and not limitation in the figures of the accompanying drawings in which like references indicate similar elements.

DETAILED DESCRIPTION

A method and apparatus of device that creates message address affinity groups and uses the affinity groups to relate messages and threads is described. In the following description, numerous specific details are set forth to provide thorough explanation of embodiments of the present invention. It will be apparent, however, to one skilled in the art, that embodiments of the present invention may be practiced without these specific details. In other instances, well-known components, structures, and techniques have not been shown in detail in order not to obscure the understanding of this description.

Reference in the specification to "one embodiment" or "an embodiment" means that a particular feature, structure, or characteristic described in connection with the embodiment can be included in at least one embodiment of the invention. The appearances of the phrase "in one embodiment" in various places in the specification do not necessarily all refer to the same embodiment.

The processes depicted in the figures that follow, are performed by processing logic that comprises hardware (e.g., circuitry, dedicated logic, etc.), software (such as is run on a general-purpose computer system or a dedicated machine), or a combination of both. Although the processes are described below in terms of some sequential operations, it should be appreciated that some of the operations described may be performed in different order. Moreover, some operations may be performed in parallel rather than sequentially.

The terms "server," "client," and "device" are intended to refer generally to data processing systems rather than specifically to a particular form factor for the server, client, and/or device.

A method and apparatus of device that creates message address affinity groups and optionally uses them to relate messages and threads is described. In an exemplary method, the device receives messages, where the messages include one or more message addresses. The device determines multiple affinity groups of message addresses based on a probability that a message including one of the message addresses also includes one or more of the other message addresses in the affinity group. In addition, the device optionally presents one or more affinity groups. Furthermore, the device can use these affinity groups to relate message threads and/or relate messages.

Figure 1:
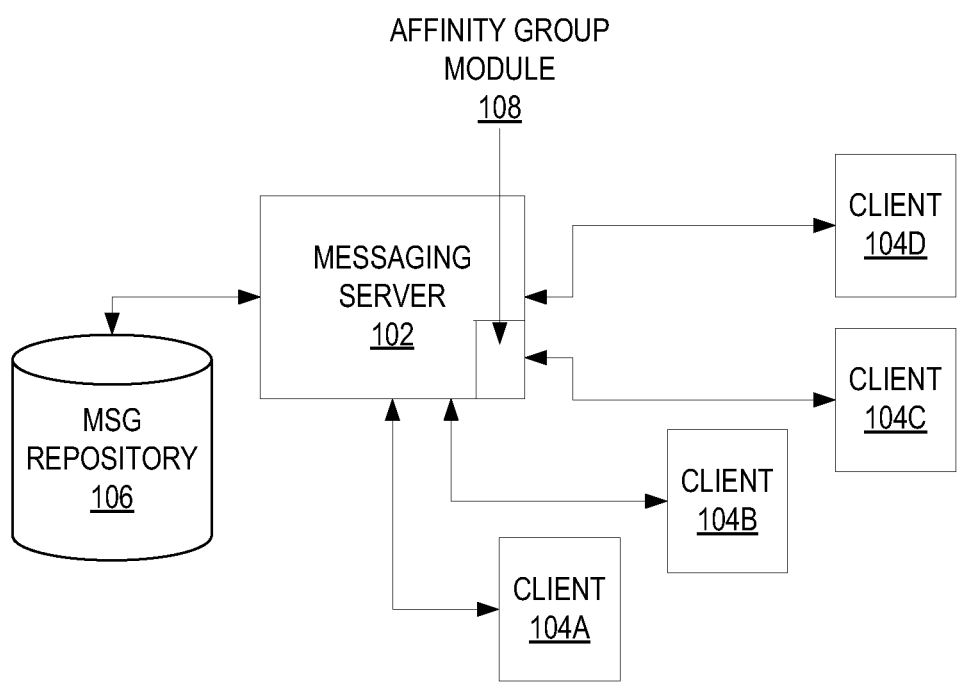
FIG. 1 is a block diagram of one embodiment of a message server that exchanges messages with different messaging clients.

FIG. 1 is a block diagram of one embodiment of a message server 102 that exchanges messages with different messaging clients 104A-D. In FIG. 1, messaging server 102 is a server that receives and forwards different types of messages with the clients 104A-D. While in one embodiment, messaging server 102 is an email server, in alternate embodiments, messaging server 102 is another type of messaging server (Short Message Service (SMS), Multimedia Messaging Service (MMS), Enhanced Messaging Service (EMS), Twitter, Facebook messages, telephone message logs, instant messaging, etc., and/or other types of messages known in the art). In another embodiment, messaging server 102 can be a messaging server that can receive and forward multiple different types of messages. While in one embodiment, messaging server 102 stores the messages in a message repository 106, in alternate embodiments, the messages can reside on the messaging server 102, one or more of the clients 104A-D, message repository 106 and/or a combination thereof.

In one embodiment, messaging server 102 includes affinity group module 108 that calculates one or more message address affinity groups from a collection of messages. In one embodiment, an affinity group is a group of message addresses that are related to each other. In another embodiment, an affinity group is a set of message addresses (e.g., email addresses, phone numbers, social network identifier, etc.) representing people or groups who tend to communicate with each other for a particular common purpose. For example and in one embodiment, an affinity group is a group of email addresses (in the To, From, and CC fields) for email users who may be working on the same project, belong to the same social group, company, etc. For example and in one embodiment, an affinity group can be a group of phone numbers for SMS users who are working on the same project, belong to the same social group, etc. In another embodiment, the entities that communicate, communicate above a certain minimum frequency for that common particular purpose. For example and in one embodiment, this minimum frequency is based upon a probability that a message address for one of the entities appears in a message with another one of the entities. This is further described with reference to FIG. 5 and Equation (1) below.

In one embodiment, affinity group module 108 computes different affinity groups for one, some and/or all user messaging accounts known to the messaging server. While in one embodiment, the addresses in the affinity group can be of the same type of address, in alternate embodiments, the addresses can be different types (e.g., email, SMS, MMS, EMS, Facebook ID or other social network identifier, etc.).

Clients 104A-D can any type of device that is used to download and/or view the messages (e.g., laptop, personal computer, cellular phone, personal digital assistance, tablet, game console, etc.). In one embodiment, one or more clients 104A-D further include an affinity group module (not shown) to calculate message address affinity groups from a collection of messages known to respective client 104A-D. For example and in one embodiment, client 104A knows about messages for users A and B. In this embodiment, client 104A can create affinity groups using the messages for users A and/or B. A message can have a To, From, and/or CC fields that indicates which users that are associated with that message. The structure of a message is further described in FIG. 2 below. In one embodiment, server 102 computes the affinity groups and stores and/or transmits the affinity group information to the one or more clients 104A-D. In this embodiment, server 102 can transmit and/or provide the affinity group information to clients 104A-D even if clients 104A-D do not have the messages from which the affinity groups are computed.

Figure 2:
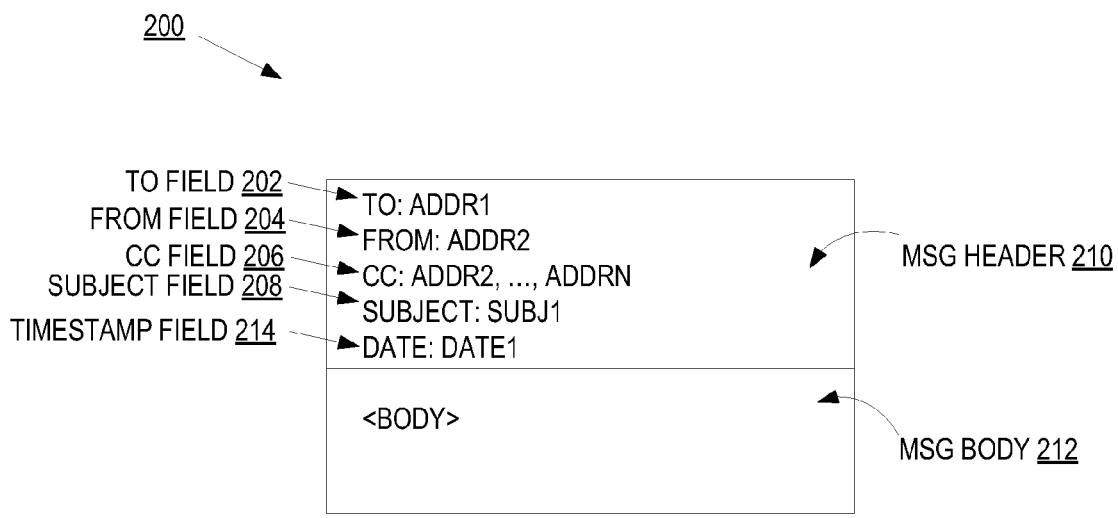
FIG. 2 is a block diagram of one embodiment of a structure of message.

FIG. 2 is a block diagram of one embodiment of a structure of message 200. While in one embodiment, message 200 is an email message, in alternate embodiments, message 200 is another type of message (SMS, MMS, EMS, Twitter, Facebook messages, telephone message logs, instant messaging, etc., and/or other types of messages known in the art). In one embodiment, message 200 includes a message header 210 and a message body 212. The message header 210 includes control information and can include one or more of the following: a To field 202, a From field 204, a CC field 206, Subject field 208, and/or Timestamp field 214. The To field is the field that indicates who (or what) the message is addressed to. In one embodiment, the To field includes a message address such as a email address, phone number, twitter group of follower(s), Facebook ID or other social network identifier, person or group's name, other type of identifier (employee number, customer number, etc.), etc. and/or a combination thereof. This target address can be one address, many addresses, one or more group addresses, and/or a combination thereof.

The From field 204 is a field that indicates who (or what) the message is from. Similar to the To field 202, the From field 204 can be a message address such as an email address, phone number, twitter group of follower(s), Facebook ID or other social network identifier, etc. and/or a combination thereof.

The from address can be one address, many addresses, a group address, and/or a combination thereof.

The CC field 206 is a carbon copy address, which are secondary addresses to receive a message that is directed to another. Similar to the To field 202, the CC field 206 can be a message address such as an email address, phone number, twitter group of follower(s), Facebook ID or other social network identifier, etc. and/or a combination thereof. The CC address can be one address, many addresses, a group address, and/or a combination thereof. While in one embodiment, message 200 includes the CC field 206, in alternate embodiments, message 200 does not include the CC field 206. The Subject field 208 includes a description of the subject of the message. In one embodiment, the Subject field 208 can be used to group messages into a thread.

The message body 212 includes the content of the message. For example and in one embodiment, message body 212 can be an email, SMS/EMS/MMS, twitter, Facebook, etc. type of content. In alternate embodiments, the message does not include a message body 212, such as a telephone log.

In one embodiment, the affinity groups module 108 determines the affinity groups using the data from the message headers, but does not use the content in the message body 212. For example and in one embodiment, affinity groups module 108 uses the addresses and timestamps from the message 200 to determine which addresses are included in different affinity groups. In one embodiment, an affinity group is a group of message addresses that are related to each other. For example and in one embodiment, an affinity group can be a group of message address that reflect a group of users working on the same project, being in the same department, same social group, any set of people and/or groups that tend to communicate with each other for a particular common purpose, etc. For example and in one embodiment, an affinity group can represent a set of addresses that are used to address the same person or group. In this example, a work and home address from the same person may form an affinity group. Calculating the affinity groups is further described in the FIG. 5 below.

Figure 3:
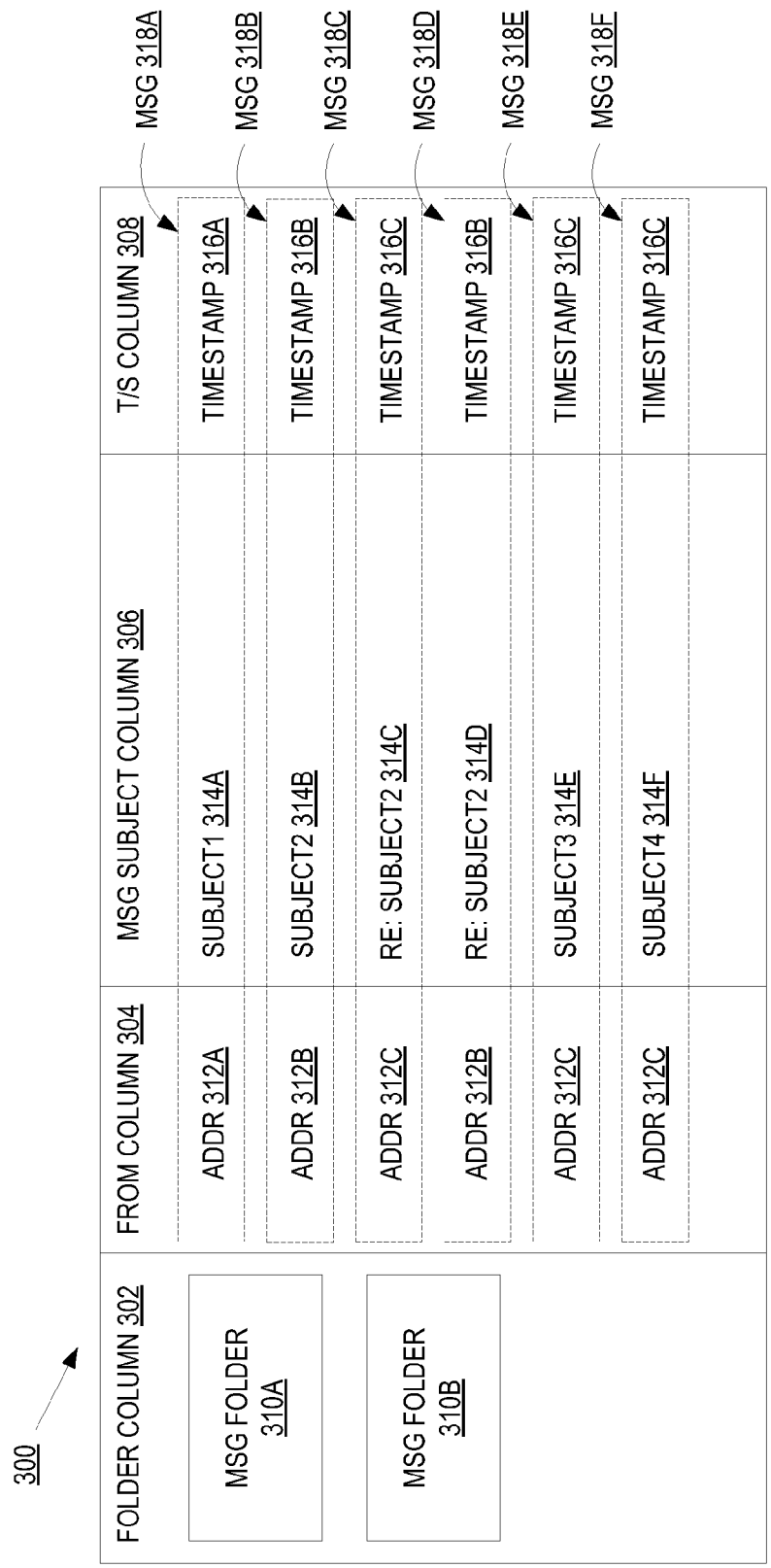
FIG. 3 is a block diagram of one embodiment of a messaging user interface illustrating a group of messages that can be organized into different message folders.

FIG. 3 is a block diagram of one embodiment of a messaging user interface (UI) 300 illustrating a group of messages 318A-F that can be organized into different message folders. In FIG. 3, message UI 300 is divided into different columns to present the messaging data: folder column 302, from column 304, message subject column 306, and a timestamp column 308. In one embodiment, folder column 302 includes message folders 310A-B. In one embodiment, these message folders 310A-B are used to organize messages. For example and in one embodiment, message folders 310A-B could be an inbox, a folder to organize messages by content, addressing (to, from, cc, etc.), timestamp, etc. While in one embodiment, the messaging UI 300 is for messages of one user, in alternate embodiments, the messaging UI 300 can be for more than one user.

In one embodiment, each message 318A-F is displayed across the remaining columns 304, 306, and 308. In this embodiment, the From fields of messages 318A-F are displayed in the From column 304. The data in the From fields can have the same and/or different addresses. For example and in one embodiment, message 318A is from address 312A, message 318B and 318D are from address 312B, and messages 318C, 318E, and 318F are from address 312C. Thus, different messages can be from the same or different addresses. The subject of the messages 318A-F (if part of the message) is displayed in subject column 306, and can be different subjects, related to the same subject. For example and in one embodiment, message 318A has subject1 314. Messages 318B-D are related to subject2 (314B-D). In one embodiment, this relationship of subjects can be used to organize messages 318B-D into a single thread of messages. Message threads are further described in FIG. 7 below. Furthermore, messages 318E-F have different subjects, namely, subject3 314E and subject4 314F, respectively. In addition, each message 318A-F will have its own timestamp and is displayed in the timestamp column 308. While in one embodiment, each timestamp is the date and time the message was received, in alternate embodiments, the timestamp can be different (time and date message was sent, relayed, received, and/or combinations therein).

Figure 4:
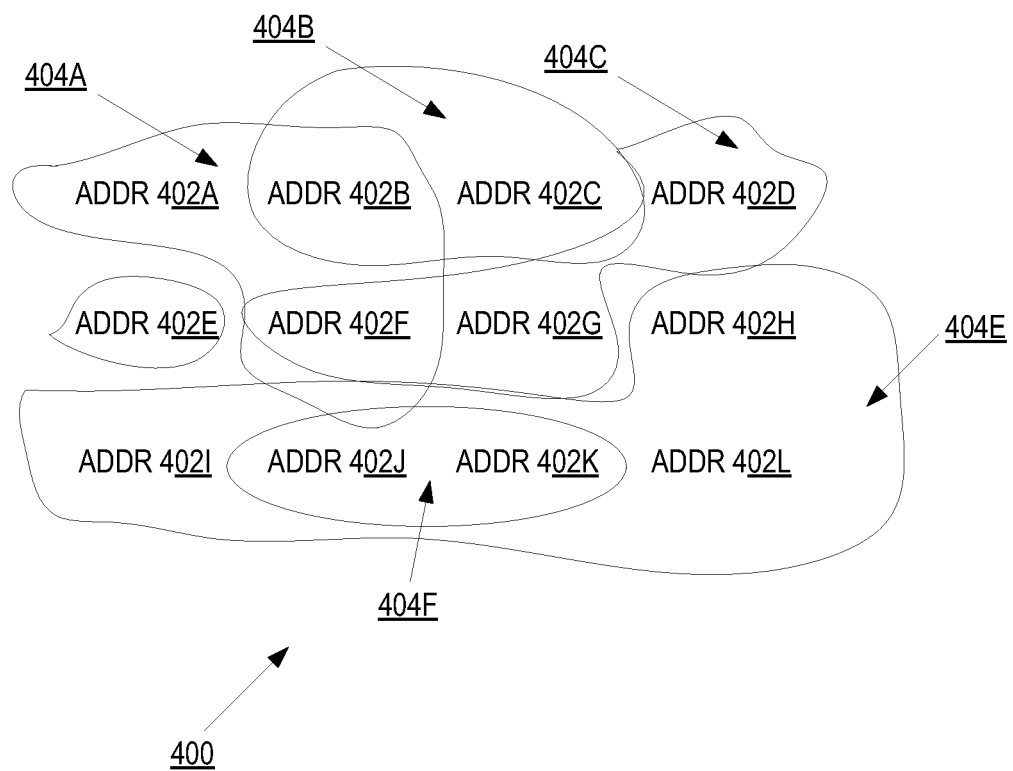
FIG. 4 is a block diagram of one embodiment of different message address affinity groups.

As described above, either the messaging server 102 or clients 104A-D can include an affinity group module to calculate different affinity groups of message addresses. As described above, a messaging address affinity group is a group of message addresses that are related to each other. FIG. 4 is a block diagram of one embodiment of different messaging affinity groups 404A-F. In FIG. 4, addresses 402A-L are grouped into affinity groups 404A-F. As illustrated in FIG. 4, affinity groups can one or more addresses in the group and/or one address can be one group or can be in different groups. For example and in one embodiment, affinity group 404A includes addresses 402A, B, and E; affinity group 404B includes addresses 402B and 402C; affinity group 404C includes addresses 402D, 402F, and 402G; affinity group 404D include one address, address 402E; affinity group 404E includes many addresses, address 402H-L; and affinity group 404F is a subset of affinity group 404E with addresses 402J and 402K. In the illustrated groups, some addresses are part of one group (e.g., addresses 402A, 402C-E, and 402G-L), while other addresses can be part multiple groups (e.g., addresses 402B and 402D). In addition, an affinity group 404F that is a subset of another 404E can represent a smaller working group within a larger group (e.g., department, company, organization, etc.).

Figure 5:
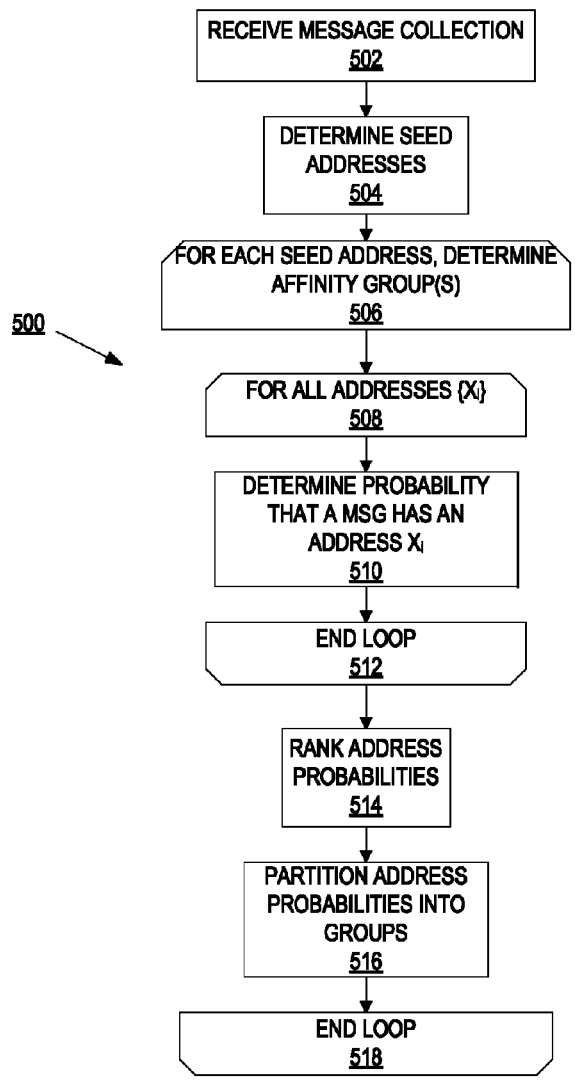
FIG. 5 is a flow diagram of one embodiment of a process to create message address affinity groups from a collection of messages.

As described above, affinity group module 108 can be used to compute affinity groups from a collection of messages. FIG. 5 is a flow diagram of one embodiment of a process 500 to create one or more message address affinity groups from a collection of messages. In FIG. 5, at block 502, process 500 receives a collection of message information. While in one embodiment, the collection of message information is a collection of messages, in alternate embodiments, the collection of message information is some or all of the message header information for the message. For example and in one embodiment, process 500 receives the addressing, timestamp, and occurency information that is used below to calculate the message address affinity group. In one embodiment, process 500 can receive this subset of messaging information because process 500 does not rely on the message body or other message header information in calculating these affinity groups. While in one embodiment, the collection of message information is for one user account, in alternate embodiments, the collection of message information is for more than one user account (e.g., a corporate database of messages, analyzing multiple user message accounts, etc.). Furthermore, in one embodiment, the collection of messages can be all of the same type of message or be of different types of messages. For example and in one embodiment, process 500 receives a collection of email information to calculate email address affinity groups. In this embodiment, different message addresses can be used by the same person or group for different purposes, and keeping these messages addresses allows process 500 to associate each message address with the appropriate affinity group according to the purpose for which it is used. For example and in one embodiment, if a person uses one email address to communicate with co-workers and another to communicate with members of a soccer league, each address will be associated with different affinity groups—one affinity group that includes co-workers addresses and another affinity group that includes soccer league members' addresses. As another example and in another embodiment, process 500 receives a collection of message information of different message types (e.g., email, twitter, instant messaging, and Facebook messages for multiple user accounts). In one embodiment, process 500 uses a table to map different message addresses to the same person and/or group.

Because process 500 calculates message information based on a subset of the message header information, the full message information does not need to be saved for affinity group analysis. For example and in one embodiment, server 102 saves the requisite message header information in message repository 106 for later analysis, such as message address, timestamp, and occurency information.

Process 500 determines a set of seed addresses from the collection of message information at block 504. While in one embodiment, the seed address is chosen from a group of top N addresses, in alternate embodiments, the seed address is chosen alternatively (from a subset of the N addresses, one of the top 100 address (or some other fixed number), etc.). In one embodiment, process 500 determines seed addresses by determining the top N addresses by ranking other addresses a given message address communicates with based on timestamps and occurrences of the other messages. Determining the seed addresses is further described in FIG. 6 below.

Process 500 executes an outer processing loop (blocks 506-518) to determine the affinity groups for each of the seed addresses in the collection of message information.

Process 500 further executes an inner processing loop to compute a probability that a message has an address for each address in the set of addresses $\{X_i\}$ (blocks 508-512). While in one embodiment, the addresses are selected from all of the address fields of the message, in alternate embodiments, the addresses are from a subset of the address field (e.g., the To, From, and/or CC fields). In one embodiment, the set of addresses is the set of message addresses received at block 502 above. At block 510, process 500 computes a probability $P(X_i|a)$ that a message has an address $X_i$ given that the message has a seed address a. In one embodiment, the $P(X_i|a)$ is computed using Equation (1):

$$P(X_i|a) = \frac{\# \text{ messages } (X_i, a)}{\# \text{ messages } (a)} \quad (1)$$

where # messages $(X_i, a)$ is the number of messages that have both addresses $X_i$ and a, and # messages (a) is the number of messages that have address a. In one embodiment, $X_i$ is not an address that is the owner of the user account of addresses that are being analyzed by process 500. In one embodiment, address a can be an address that is the owner of the user account of addresses that are being analyzed by process 500. In one embodiment, the probabilities range from zero (no probability that message addresses a and $X_i$ appear together in any of the message information in the collection) to one, meaning that message addresses $X_i$ appears whenever message address a appears in all the message information in the collection. The inner processing loop ends at block 512.

After executing the inner processing loop, process 500 has calculated probabilities for each of the addresses in the set $\{X_i\}$. At block 514, process 500 ranks these address probabilities. While in one embodiment, process 500 ranks the address probabilities from highest to lowest value, in alternate embodiments, process 500 ranks the address probabilities from lowest to highest.

At block 516, partition the address probabilities into probability clusters. In one embodiment, process 500 partitions the probabilities into a primary cluster and one or more secondary clusters by analyzing the spacing between the different probabilities. In this embodiment, the primary cluster relates addresses that have a high probability of appearing in messages that include the seed address. In this embodiment, the largest probability gap is used to partition the probabilities in to a high probability (primary) cluster and a low probability (secondary) cluster. For example and in one embodiment, consider addresses A, B, C, D, E, and F, where A is the seed address, and addresses B, C, D, E, and F have probabilities 0.81, 0.8, 0.6, 0.35, and 0.2, respectively. In this example, process 500 identifies the largest probability gap as occurring between addresses D (probability 0.6) and E (probability 0.35). In this example, process 500 creates the affinity group {A, B, C, D} for the seed A. In another embodiment, process 500 does not include addresses in an affinity group that have a probability value below a certain threshold. Considering the previous example, and assuming the threshold is 0.33, address F has a probability that is below the threshold, so, in this example, process 500 creates the affinity group {A, B, C, D, E} for the seed A.

Furthermore, in this embodiment, if N addresses are used as the seeds, process 500 can generate up to N affinity groups (possibly fewer if you consider that two different seeds may end up generating the same group). In one embodiment, process 500 may generate the same affinity group using two different seed addresses. In this embodiment, process 500 would generate less than N affinity groups. Alternatively, process 500 would generate a different affinity group for each of the N seed addresses, resulting in N different affinity groups.

In an alternate embodiment, process 500 partitions the probabilities into more than two probability clusters. In this embodiment, process 500 could generate more than N affinity groups.

Figure 6:
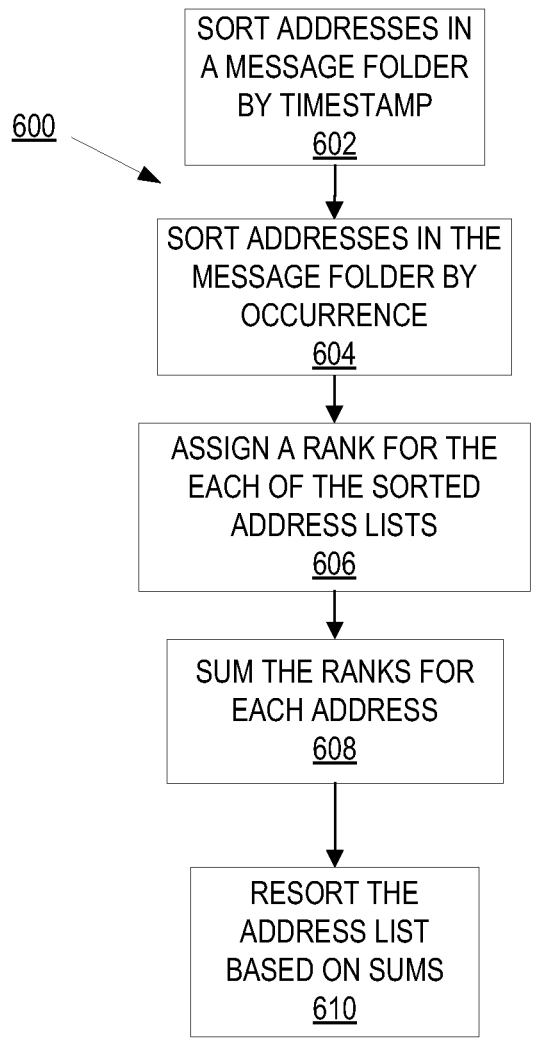
FIG. 6 is a flow diagram of one embodiment of a process to rank addresses based on message timestamp and address occurrences.

As described above in FIG. 5, block 504, part of calculating the message affinity groups is to rank the message addresses. FIG. 6 is a flow diagram of one embodiment of a process 600 to rank addresses based on the message timestamp and address occurrences. In one embodiment, the message timestamp and addresses are part of the message header as described above in FIG. 2. At block 602, process 600 sorts the message addresses into a timestamp list based on the timestamp of messages associated with the message addresses. In one embodiment, process 600 sorts the addresses based on the most recent message associated with an address. In another embodiment, process 600 sorts addresses from certain fields (e.g., based on To field and not the CC field, etc.).

Process 600 further sorts the addresses into an occurrence list based on the occurrency of addresses at block 604. In one embodiment, an address occurrence is the number of times an address appears in the collection of message information. For example and in one embodiment, an address that appears more times in the collection of message information would be higher on the occurrence list than addresses that would appear fewer times. While in one embodiment, process 600 sorts the addresses using all of the message header fields, in alternate embodiments, process 600 sorts the addresses using some of the message header fields (To, From, and/or CC fields).

At block 606, process 600 assigns a rank for each of the sorted address lists. In one embodiment, process 600 assigns a value to each address in each of the sorted lists. For example and in one embodiment, process 600 assigns the value one to the top address in each sorted list, the value two to the next address in each list, etc. Process 600 sum the ranks for each address on the lists at block 608. Using the summed ranks, process 600 resorts the address list at block 610. In one embodiment, the highest ranked is the address with the lowest ranked value.

Figure 7:
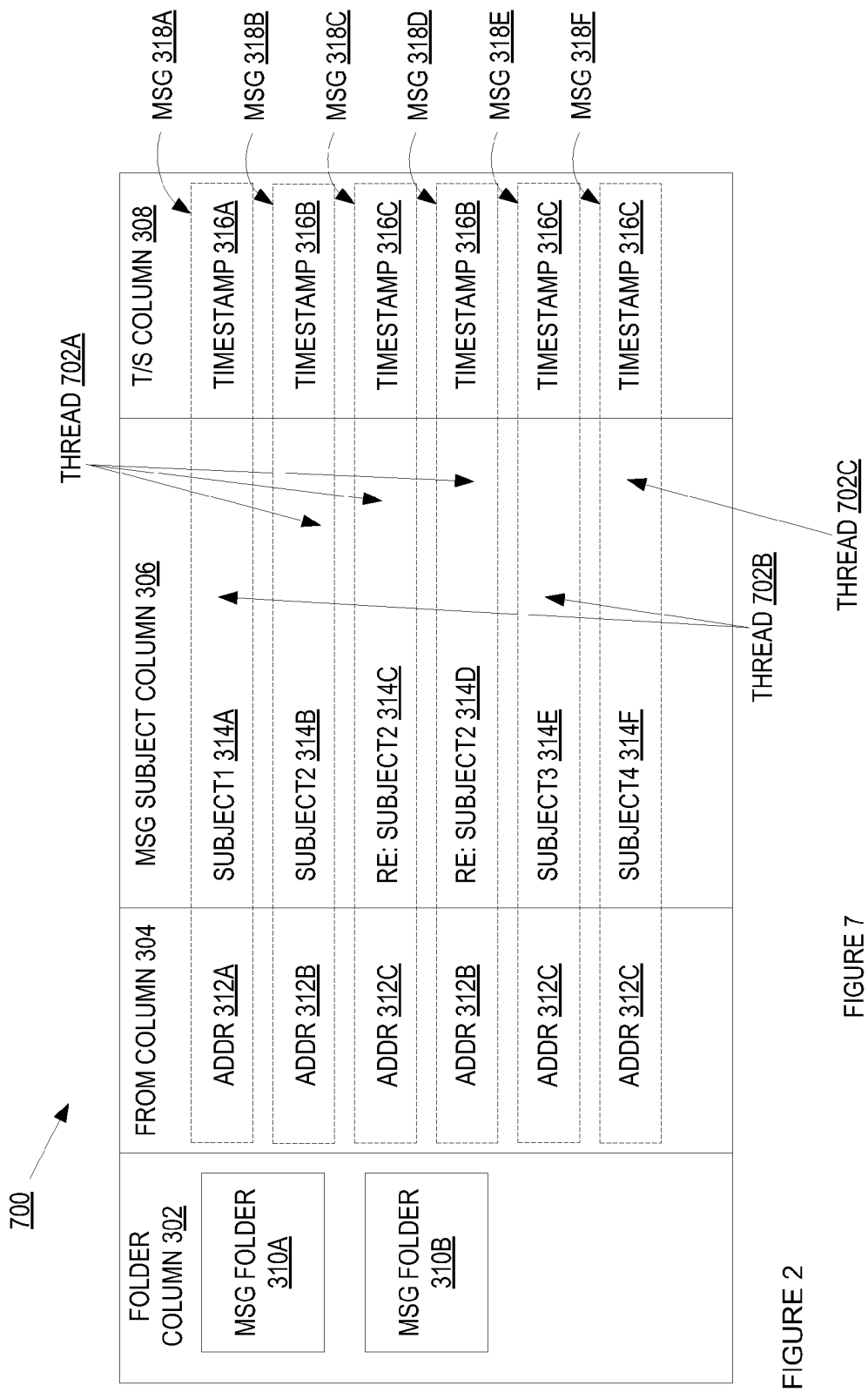
FIG. 7 is a block diagram of one embodiment of a messaging user interface illustrating a group of messages that can be organized into different threads.

In FIG. 5, process 500 calculates affinity groups from a collection of messages. One use of these affinity groups is to determine which sets of message threads are similar. As is known in the art a message thread is a set of messages that are related to each other. While in one embodiment, a message thread can be related based on the subject of message, in alternative embodiment, a message thread can be based on some other property of the related messages (e.g., using an In-Reply-To field, having each message be in its own thread, etc. and/or combination thereof). FIG. 7 is a block diagram of one embodiment of a messaging user interface that illustrates a group of messages that can be organized into different threads. In FIG. 7, columns 302, 304, 306, and 308, message folders 310A-B, messages 318A-F, from addresses 312A-C, subjects 314A-F, and timestamps 316A-F are as described in FIG. 3 above. In addition, in FIG. 7, messages 318A-F are organized into message threads 702A-C. For example and in one embodiment, thread 702A includes messages 318B-D as these messages are related to subject2 as illustrated in message subjects 314B-D. Furthermore, messages 318A and 318E are part of thread 702B event though these messages have different subjects, namely subject1 314A and subject3 314E. For example, message 318A may be a reply to message 318E where the sender changed the subject of the message. In addition, a thread may have one message in the thread, such as thread 702C which has message 318F.

Figure 8:
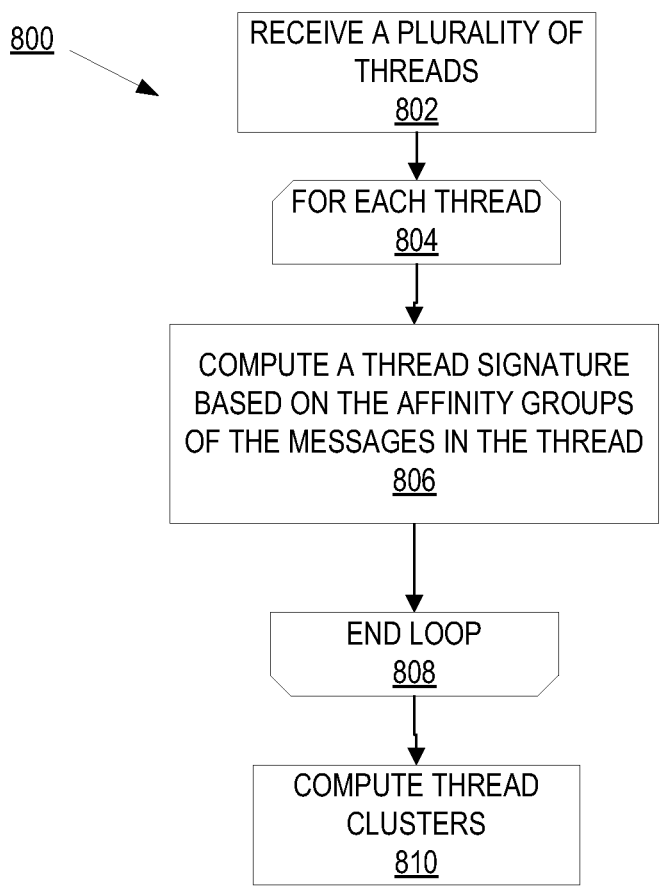
FIG. 8 is a flow diagram of one embodiment of a process to compute related threads based on message address affinity groups.

FIG. 8 is a flow diagram of one embodiment of a process to compute clusters of threads using message affinity groups. In FIG. 8, process 800 receives a plurality of threads at block 802. While in one embodiment, for each thread, process 800 receives all of the message information included in the thread, in alternate embodiments, process receives less than all of the message information (e.g., some or all of the message header information, etc.).

Process 800 further executes a processing loop (blocks 804-808) to compute a thread signature for each of the received threads. At block 806, process 800 computes a thread signature using message affinity groups. In one embodiment, process 800 computes the thread signature by determining distances between emails of the thread and affinity group(s). In one embodiment, the thread signature is a vector of values measuring the distance of each message from the top N affinity groups. Computing a thread signature is further described in FIG. 9 below. Process 800 ends the processing loop at block 808.

At block 810, process 800 computes the thread clusters using the thread signatures computed above. In one embodiment, process 800 computes a similarity measure between the threads using the thread signatures. For example and in one embodiment, process 800 computes similarity measures between the thread value vectors using one the ways to compute similarity measures as known in the art (e.g., computing an angle between the two vectors, a Manhattan distance, summing the differences of each of the vector elements, etc., or other similarity measure between vectors as known in the art. Using the similarity measures, process 800 clusters the threads using clustering algorithms as known in the art (e.g., k-means clustering, QT clustering, fuzzy clustering, spectral clustering, etc.). In one embodiment, process 800 clusters the threads by considering two of the thread value vectors to be in the same cluster if the non-zero values of the thread value vector in the same position in the vectors. This embodiment is useful if the there are a number of zero elements and the non-zero elements tend to define the vector.

Figure 9:
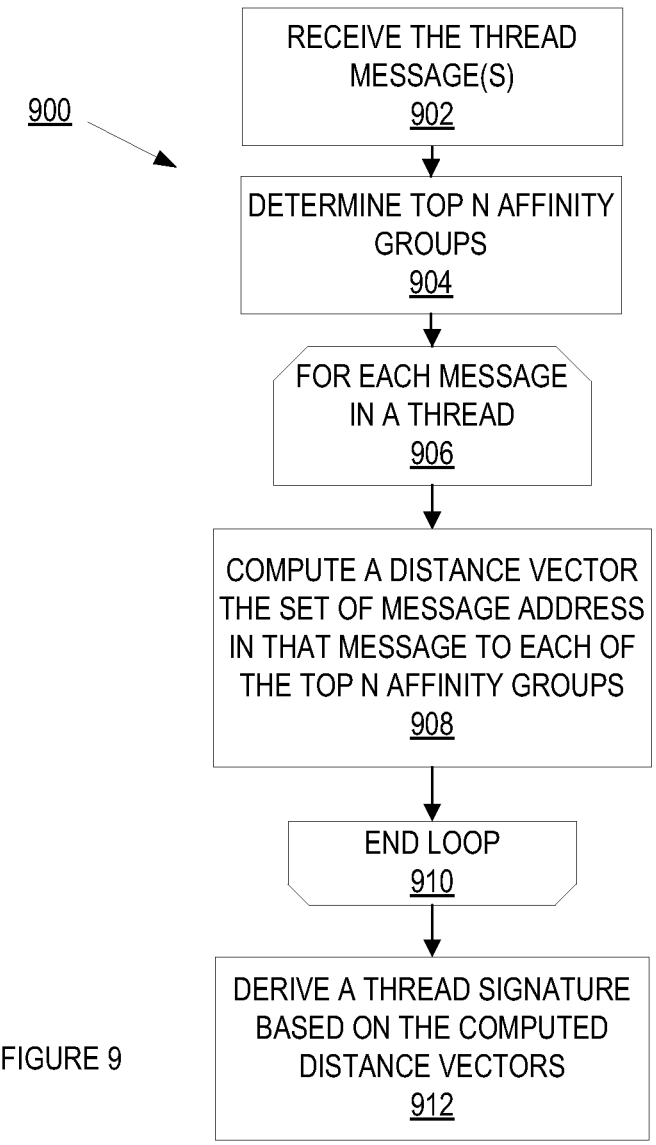
FIG. 9 is a flow diagram of one embodiment of a process to compute a thread signature based on message address affinity groups.

As described above, process 800 uses a thread signature to compute clusters of threads. FIG. 9 is a flow diagram of one embodiment of a process 900 to compute a thread signature based on message affinity groups. In FIG. 9, process 900 receives the messages in the thread at block 902. As described above, a thread can have one or more messages. At block 904, process 900 determines the top N affinity groups. In one embodiment, process 900 calculates these affinity groups as described in FIG. 5 above. For example and in one embodiment, process 900 computes the top N affinity groups and ranks them based on which seed address was used. In an alternate embodiment, process 900 retrieves the affinity groups that may have been stored in a repository, such as message repository 106 as described in FIG. 1 above. While in one embodiment, process 900 calculates the top N affinity groups by taking a fixed number of the top affinity groups, in alternate embodiments, process 900 determines a subset of top affinity groups differently (e.g., taking a top percentage of affinity groups, etc.).

Process 900 further executes a processing loop (blocks 906-910) to compute a distance from each message in the thread to the top N affinity groups.

At block 908, process 900 computes a vector of distances from the set of message addresses in the message to each of the sets of message addresses in the top N affinity groups. In one embodiment, process 900 calculates the Jaccard similarity coefficient between the message addresses in the message and each of the messages addresses in one of the top N affinity groups. For example and in one embodiment, the Jaccard similarity coefficient between the message addresses in each of the top N affinity groups and the addresses in a message is given in Equation (2):

$$D_i = \frac{num(A_m \cap \{A_{AG_i}\})}{num(A_m \cup \{A_{AG_i}\})} \qquad (2)$$

where $D_i$ is the Jaccard similarity coefficient between message M and affinity group $AG_i$, $A_m$ is the set of message addresses in message and $\{A_{AGi}\}$ is the set of message address in $AG_i$. In one embodiment, a Jaccard similarity coefficient of 1 means the addresses in message A are identical to the addresses in affinity group $AG_i$. Alternative, a Jaccard similarity coefficient of 0 means the addresses in message A do not overlap with addresses in affinity group $AG_i$. In one embodiment, process 900 calculates a distance vector D between message m and the top N affinity groups, where the elements of distance vector D are given by Equation (2). Alternatively, process 900 could calculate the vector of distances using other measures known in the art (Tanimoto distance, etc.). The processing loop ends at block 908.

Process 900 derives a thread signature from the different distance vectors associated with the thread at block 910. In one embodiment, process 900 takes the average of the different distance vectors to derive a thread signature. For example and in one embodiment, if a thread had two messages, $M_1$ (3 addresses, $A_1, A_2, A_3$) and $M_2$ (four addresses, $A_1, A_2, A_3, A_4$) and there were two affinity groups $F_1$ (two addresses $A_1, A_3$) and $F_2$ (three addresses $A_2, A_4, A_5$), the distance from $M_1$ to $F_1$ would be 0.67, and the distance from $M_1$ to $F_2$ would be 0.2, yielding a distance vector $D_1$ of (0.67, 0.2) for message $M_1$. Similarly and in this embodiment, the distance calculation for $M_2$ would be yield a distance vector $D_2$ of (0.5, 0.4). In this embodiment, the thread's signature vector would be the average of $D_1$ and $D_2$, or (0.59, 0.3). In an alternate embodiment, process 900 derives a thread signature by using a weighted average of the different distance vectors. For example, more recent messages could be weighted more than less recent ones.

Figure 10:
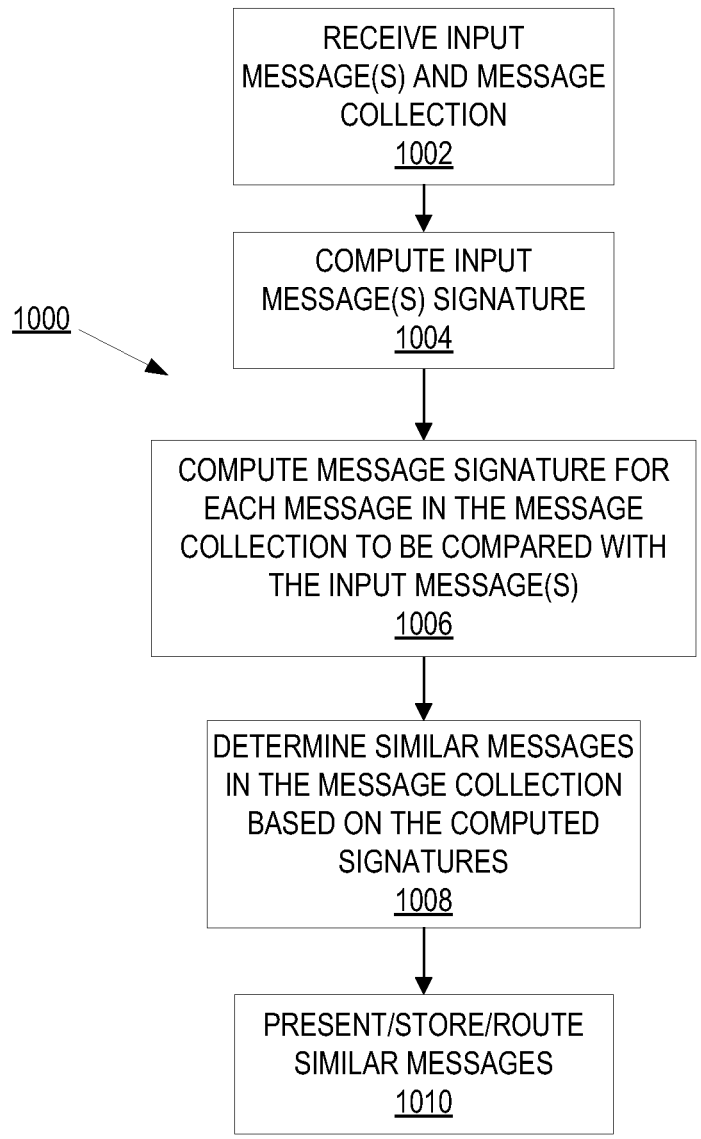
FIG. 10 is a flow diagram of one embodiment of a process to determine related messages based on message address affinity groups.

In FIGS. 8 and 9, the affinity groups are used to determine which message threads are close. Another use of affinity groups can be to determine which other messages are related to one or more selected messages. In one embodiment, determining related messages can be used to "focus" an inbox or other folder of messages, for automatic message folder creation, and/or for automatic message filing. FIG. 10 is a flow diagram of one embodiment of a process to determine related messages based on message affinity groups. In FIG. 10, process 1000 receives the input messages and a message collection. In one embodiment, the input messages are a subset of messages chosen from the message collection by a user so as to determine other messages in the message collection that are related to the input messages. While in one embodiment, there is one input message, in alternate embodiments, there is more than one input message. In alternate embodiment, the input messages are not a subset of the message collection, but a different set of one or messages. For example and in one embodiment, the input message of a set of messages from one user account's message collection that are used to determine related messages in another user account message collection.

Process 1000 computes a signature for each of the input messages at block 1004. In one embodiment, process 1000 computes a message signature using message affinity groups as described in FIG. 9 above. In one embodiment, the message signature is computed as a thread of one message. At block 1006, process 1000 computes a message signature for each message in the message collection that is to be compared with the input messages. In one embodiment, process 1000 computes a message signature using message affinity groups as described in FIG. 9 above.

Process 1000 determines similar messages in the message collection based on the computed signatures at block 1008. In one embodiment, process 1000 determines similar messages by determining which of the message or thread signatures in the messages to be compared are close to the message signatures of the input messages. For example and in one embodiment, process 1000 compares message or thread signatures between the input messages and the message to be compared as described above for comparing thread signatures in FIG. 8, block 810 above.

Determining similar messages using affinity groups as describe in FIG. 10 can be used by a user to focus messages in a message collection. For example and in one embodiment, a user selects one or more input email messages in the inbox for that user and selects a "focus" button. A computer executes process 1000 to determine a set of emails that are similar to the selected input emails. The similar emails can be displayed to the user. As described above, this example is not limited to email messages and can be applied to other types of messages (e.g., twitter, instant messaging, Facebook messages, SMS, MMS, EMS, etc.). For example and in one embodiment, a user can select two emails and determine which Twitter or Facebook messages are similar to the selected emails.

As another example and in another embodiment, determining similar messages can be used for automatic folder creation. As described above with reference to FIGS. 3 and 7, messages can be organized into folders. In this example, a computer can compute message signatures as described in FIG. 10 for a collection of messages (e.g., a user's inbox, a user full set of messages, etc.) and cluster these messages based on the computed message signatures. The resulting message clusters can be used to create message folders of the clustered messages.

In a further example, and in a further embodiment, determining similar message can be to used to automatically place a message into one of a set of existing message folders. In this example, a computer computes a message signature for a message using message affinity groups, such as a recently received message, and compares this computed message signatures with message signatures of messages in different message folders. For example and in one embodiment, the computer executes process 1000 to determine the message signature and compares this message signature with the message signatures of the different messages in the message folders. Based on the similarity in the messages signatures, the computer can place the message into one or more of the existing message folders. In one embodiment, placing message in message folders can be used to route an incoming email to an existing email folder.

Figure 11:
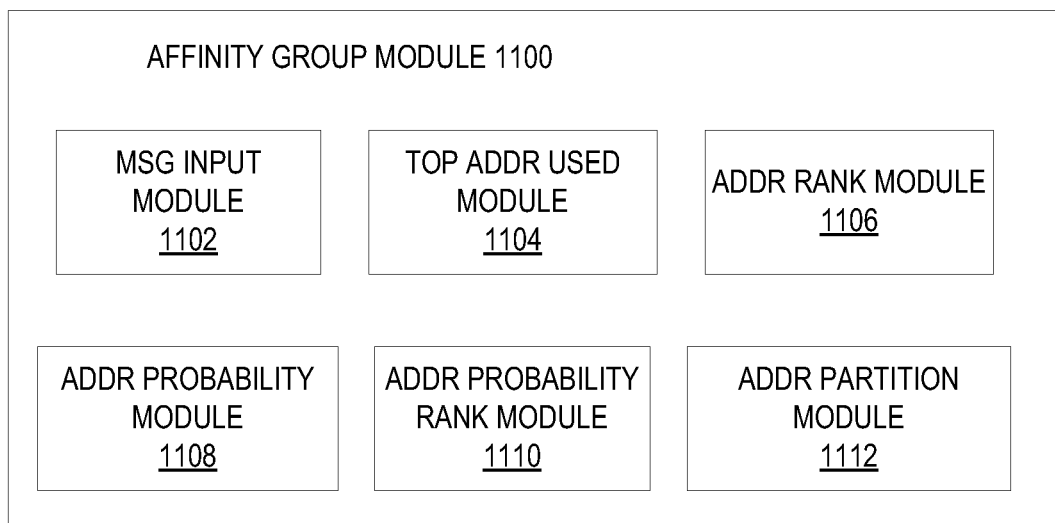
FIG. 11 is a block diagram of an affinity group module that creates message address affinity groups from a collection of messages.

FIG. 11 is a block diagram of an affinity group module 1100 that creates messaging affinity groups from a collection of messages. In FIG. 11, affinity group module 1100 comprises message input module 1102, top addresses used module 1104, address rank module 1106, address probability module 1108, address probability rank module 1110, and address partition module 1112. Message input module 1102 receives the input messages as described in FIG. 5, block 501. Top address used module 1104 determines the top N addresses as described in FIG. 5, block 502. Address rank module 1106 ranks these address as described in FIG. 5, block 506. Address probability module 1108 determine address probabilities as described in FIG. 5, block 510. Address probability rank module 1110 ranks the address probabilities as described in FIG. 5, block 514. Address partition module 1112 partitions the addresses as described in FIG. 5, block 516.

Figure 12:
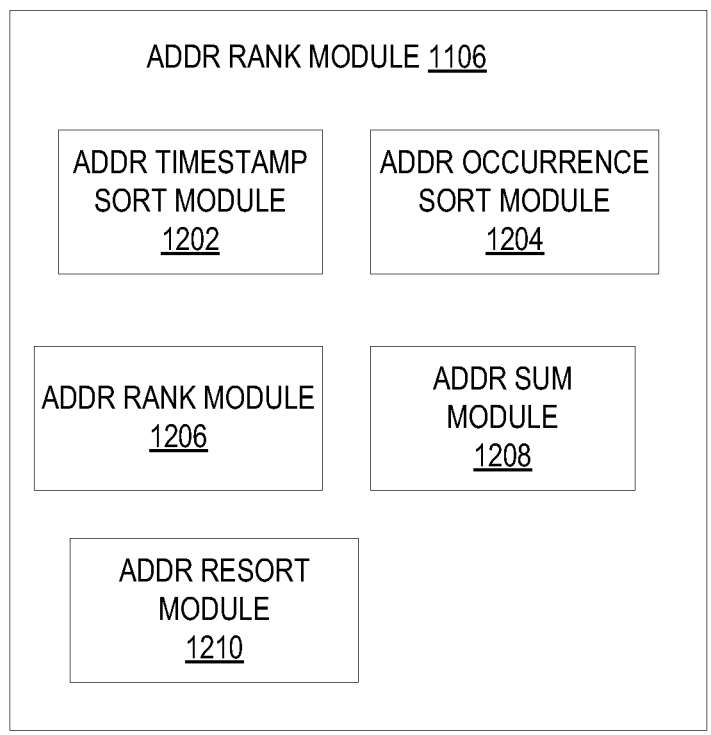
FIG. 12 is a block diagram of an addressing rank module that ranks addresses based on message timestamp and address occurrences.

FIG. 12 is a block diagram of an addressing rank module 1106 that ranks addresses based on message timestamp and address occurrences. In FIG. 12, addressing rank module 1106 comprises address timestamp sort module 1202, address occurrence sort module 1204, address rank module 1206, address sum module 1208, and address resort module 1210. Address timestamp sort module 1202 sorts addresses by timestamp as described in FIG. 6, block 602 above. Address occurrence sort module 1204 sorts addresses by occurrence as described in FIG. 6, block 604 above. Address rank module 1206 ranks addresses as described in FIG. 6, block 606 above. Address sum module 1208 sums the address ranks as described in FIG. 6, block 608 above. Address resort module 1210 resorts the addresses as described in FIG. 6, block 610 above.

Figure 13:
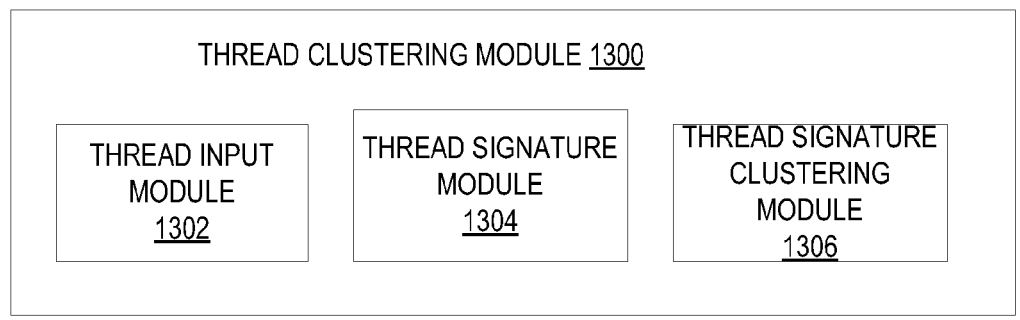
FIG. 13 is a block diagram of a related threads module that determine related threads based on message address affinity groups.

FIG. 13 is a block diagram of a thread clustering module 1300 that computes clusters of threads. In FIG. 13, thread clustering module 1300 comprises thread input module 1302, thread signature module 1304, and thread signature clustering module 1306. Thread input module 1302 receives the plurality of threads as described in FIG. 8, block 802 above. Thread signature module 1304 computes a thread signature as described in FIG. 8, block 806 above. Thread signature clustering module 1306 computes thread clusters using the thread signatures as described in FIG. 8, block 810 above.

Figure 14:
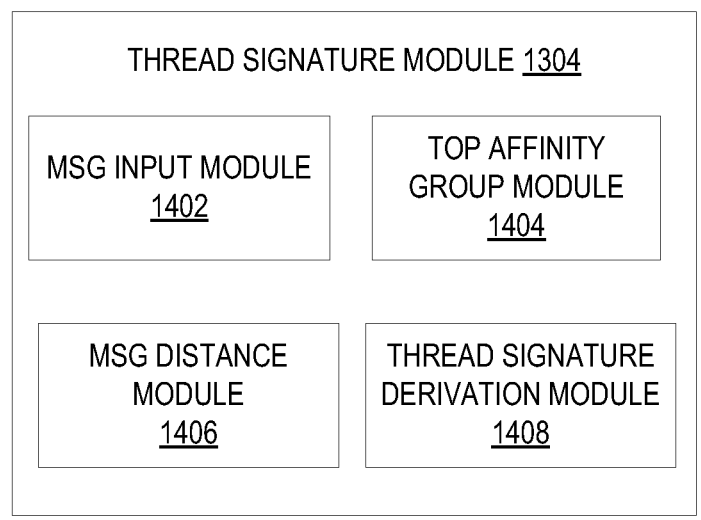
FIG. 14 is a block diagram of a thread signature module that computes a thread signature based on message address affinity groups.

FIG. 14 is a block diagram of a thread signature module 1306 that computes a thread signature based on message affinity groups. In FIG. 14, thread signature module 1306 comprises message input module 1402, top affinity group module 1404, message distance module 1406, and thread signature derivation module 1408. Message input module 1402 receives the input messages as described in FIG. 9, block 901 above. Top affinity group module 1404 computed the top N affinity groups as described in FIG. 9, block 904 above. Message distance module 1406 computes message distances as described in FIG. 9, block 906 above. Thread signature derivation module 1408 derives thread signatures as described in FIG. 9, block 910 above.

Figure 15:
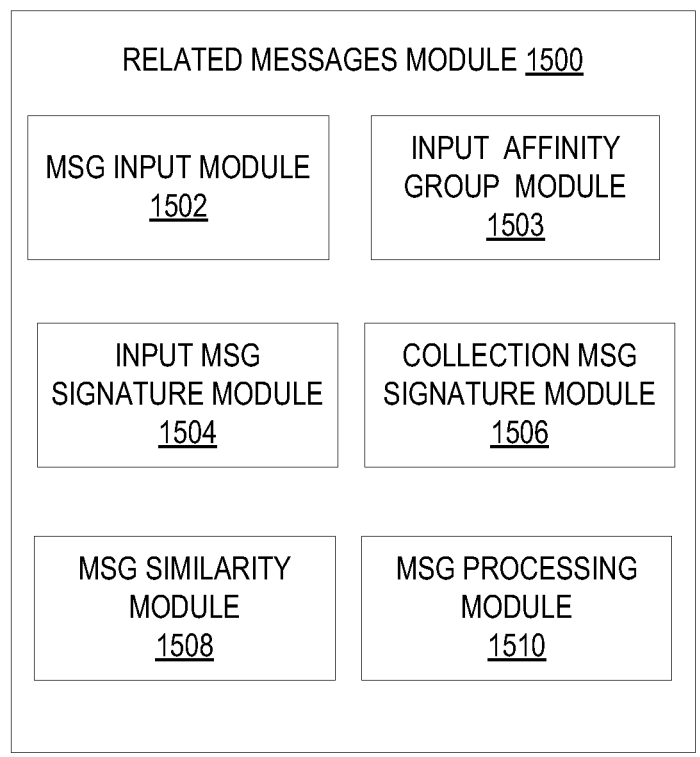
FIG. 15 is a block diagram of a related messages module that determine related messages based on message address affinity groups.

FIG. 15 is a block diagram of a related messages module 1500 that determine related messages based on message affinity groups. In FIG. 15, related messages module 1500 comprises message input module 1502, input affinity group module 1503, input message signature module 1504, collection message signature module 1506, message similarity module 1508, and message processing module 1510. Message input module 1502 receives the input message as described in FIG. 10, block 1002 above. Input affinity group module 1503 receives the affinity groups as described in FIG. 10, block 1003 above. Input message signature module 1504 computes the input message signatures as described in FIG. 10, block 1004 above. Collection message signature module 1506 computes the collection message signatures as described in FIG. 10, block 1006 above. Message similarity module 1508 determines similar messages as described in FIG. 10, block 1008 above. Message processing module 1510 processes the similar messages as described in FIG. 10, block 1010 above.

Figure 16:
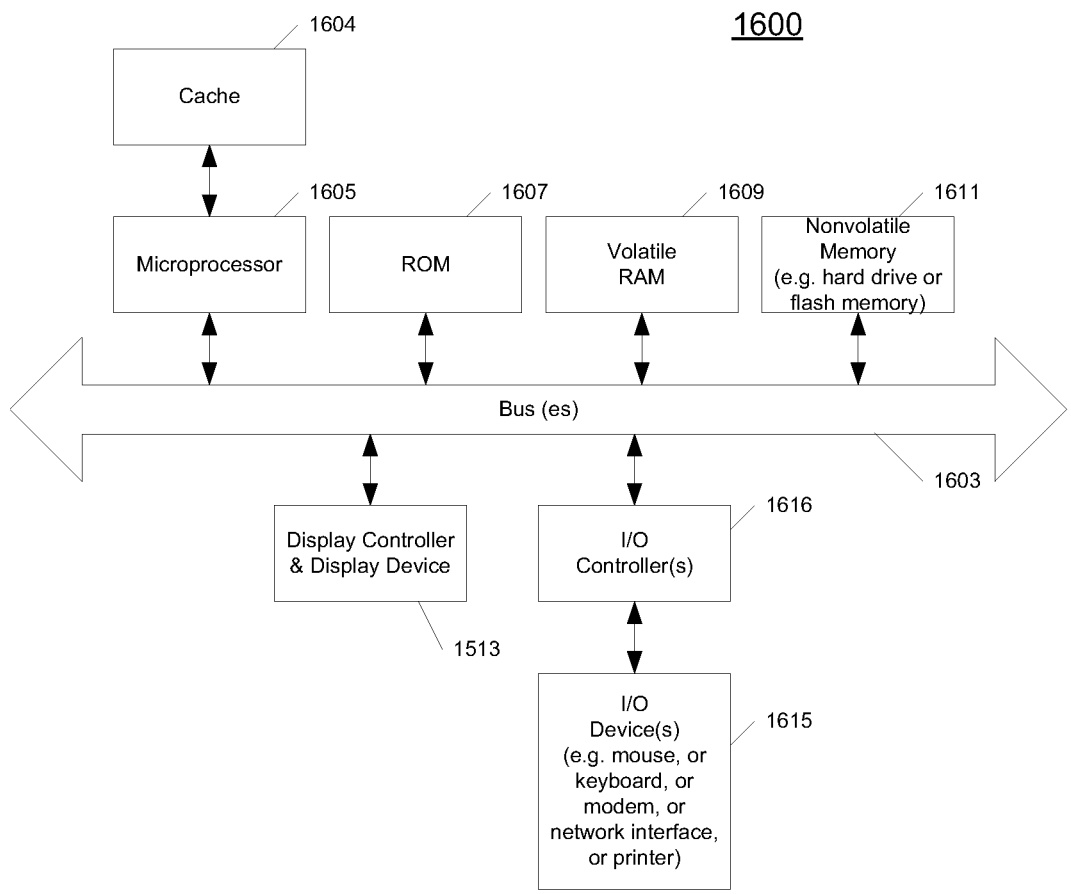
FIG. 16 illustrates one example of a typical computer system which may be used in conjunction with the embodiments described herein.

FIG. 16 shows one example of a data processing system 1600, which may be used with one embodiment of the present invention. For example, the system 1600 may be implemented including a host as shown in FIG. 1. Note that while FIG. 16 illustrates various components of a computer system, it is not intended to represent any particular architecture or manner of interconnecting the components as such details are not germane to the present invention. It will also be appreciated that network computers and other data processing systems or other consumer electronic devices which have fewer components or perhaps more components may also be used with the present invention.

As shown in FIG. 16, the computer system 1600, which is a form of a data processing system, includes a bus 1603 which is coupled to a microprocessor(s) 1605 and a ROM (Read Only Memory) 1607 and volatile RAM 1609 and a non-volatile memory 1611. The microprocessor 1605 may retrieve the instructions from the memories 1607, 1609, 1611 and execute the instructions to perform operations described above. The bus 1603 interconnects these various components together and also interconnects these components 1605, 1607, 1609, and 1611 to a display controller and display device 1613 and to peripheral devices such as input/output (I/O) devices which may be mice, keyboards, modems, network interfaces, printers and other devices which are well known in the art. Typically, the input/output devices 1615 are coupled to the system through input/output controllers 1617. The volatile RAM (Random Access Memory) 1609 is typically implemented as dynamic RAM (DRAM) which requires power continually in order to refresh or maintain the data in the memory.

The mass storage 1611 is typically a magnetic hard drive or a magnetic optical drive or an optical drive or a DVD RAM or a flash memory or other types of memory systems which maintain data (e.g. large amounts of data) even after power is removed from the system. Typically, the mass storage 1611 will also be a random access memory although this is not required. While FIG. 16 shows that the mass storage 1611 is a local device coupled directly to the rest of the components in the data processing system, it will be appreciated that the present invention may utilize a non-volatile memory which is remote from the system, such as a network storage device which is coupled to the data processing system through a network interface such as a modem, an Ethernet interface or a wireless network. The bus 1603 may include one or more buses connected to each other through various bridges, controllers and/or adapters as is well known in the art.

Figure 17:
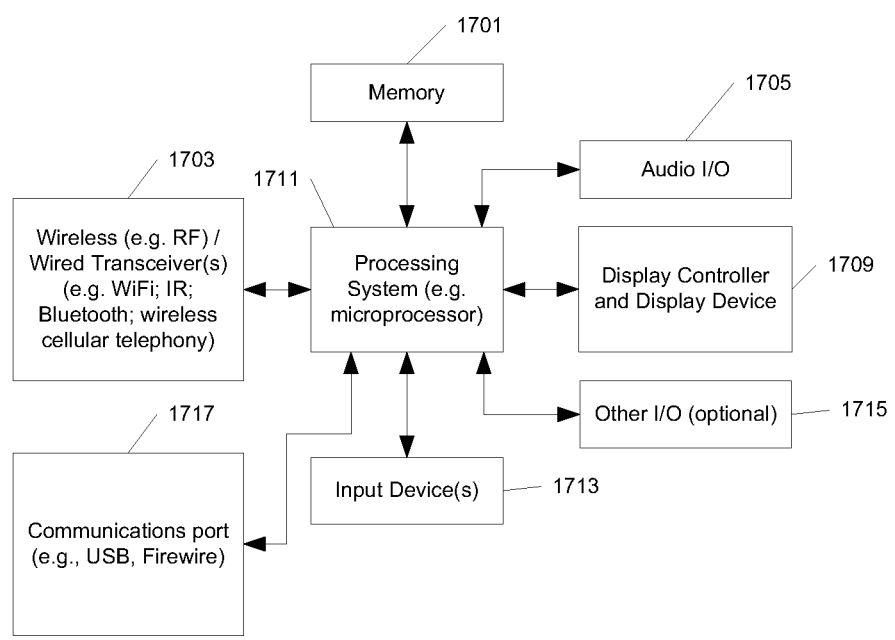
FIG. 17 shows an example of a data processing system which may be used with one embodiment of the present invention.

FIG. 17 shows an example of another data processing system 1700 which may be used with one embodiment of the present invention. For example, system 1700 may be implemented as a portable storage device as shown in FIG. 1. The data processing system 1700 shown in FIG. 17 includes a processing system 1711, which may be one or more microprocessors, or which may be a system on a chip integrated circuit, and the system also includes memory 1701 for storing data and programs for execution by the processing system. The system 1700 also includes an audio input/output subsystem 1705 which may include a microphone and a speaker for, for example, playing back music or providing telephone functionality through the speaker and microphone.

A display controller and display device 1709 provide a visual user interface for the user; this digital interface may include a graphical user interface which is similar to that shown on a Macintosh computer when running OS X operating system software, or Apple iPhone when running the iOS operating system, etc. The system 1700 also includes one or more wireless transceivers 1703 to communicate with another data processing system, such as the system 1700 of FIG. 17. A wireless transceiver may be a WLAN transceiver, an infrared transceiver, a Bluetooth transceiver, and/or a wireless cellular telephony transceiver. It will be appreciated that additional components, not shown, may also be part of the system 1700 in certain embodiments, and in certain embodiments fewer components than shown in FIG. 17 may also be used in a data processing system. The system 1700 further includes one or more communications ports 1717 to communicate with another data processing system, such as the system 1500 of FIG. 15. The communications port may be a USB port, Firewire port, Bluetooth interface, etc.

The data processing system 1700 also includes one or more input devices 1713 which are provided to allow a user to provide input to the system. These input devices may be a keypad or a keyboard or a touch panel or a multi touch panel. The data processing system 1700 also includes an optional input/output device 1715 which may be a connector for a dock. It will be appreciated that one or more buses, not shown, may be used to interconnect the various components as is well known in the art. The data processing system shown in FIG. 17 may be a handheld computer or a personal digital assistant (PDA), or a cellular telephone with PDA like functionality, or a handheld computer which includes a cellular telephone, or a media player, such as an iPod, or devices which combine aspects or functions of these devices, such as a media player combined with a PDA and a cellular telephone in one device or an embedded device or other consumer electronic devices. In other embodiments, the data processing system 1700 may be a network computer or an embedded processing device within another device, or other types of data processing systems which have fewer components or perhaps more components than that shown in FIG. 17.

At least certain embodiments of the inventions may be part of a digital media player, such as a portable music and/or video media player, which may include a media processing system to present the media, a storage device to store the media and may further include a radio frequency (RF) transceiver (e.g., an RF transceiver for a cellular telephone) coupled with an antenna system and the media processing system. In certain embodiments, media stored on a remote storage device may be transmitted to the media player through the RF transceiver. The media may be, for example, one or more of music or other audio, still pictures, or motion pictures.

The portable media player may include a media selection device, such as a click wheel input device on an iPod® or iPod Nano® media player from Apple, Inc. of Cupertino, Calif., a touch screen input device, pushbutton device, movable pointing input device or other input device. The media selection device may be used to select the media stored on the storage device and/or the remote storage device. The portable media player may, in at least certain embodiments, include a display device which is coupled to the media processing system to display titles or other indicators of media being selected through the input device and being presented, either through a speaker or earphone(s), or on the display device, or on both display device and a speaker or earphone(s). Examples of a portable media player are described in published U.S. Pat. No. 7,345,671 and U.S. published patent number 2004/0224638, both of which are incorporated herein by reference.

Portions of what was described above may be implemented with logic circuitry such as a dedicated logic circuit or with a microcontroller or other form of processing core that executes program code instructions. Thus processes taught by the discussion above may be performed with program code such as machine-executable instructions that cause a machine that executes these instructions to perform certain functions. In this context, a "machine" may be a machine that converts intermediate form (or "abstract") instructions into processor specific instructions (e.g., an abstract execution environment such as a "virtual machine" (e.g., a Java Virtual Machine), an interpreter, a Common Language Runtime, a high-level language virtual machine, etc.), and/or, electronic circuitry disposed on a semiconductor chip (e.g., "logic circuitry" implemented with transistors) designed to execute instructions such as a general-purpose processor and/or a special-purpose processor. Processes taught by the discussion above may also be performed by (in the alternative to a machine or in combination with a machine) electronic circuitry designed to perform the processes (or a portion thereof) without the execution of program code.

The present invention also relates to an apparatus for performing the operations described herein. This apparatus may be specially constructed for the required purpose, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), RAMs, EPROMs, EEPROMs, magnetic or optical cards, or any type of media suitable for storing electronic instructions, and each coupled to a computer system bus.

A machine readable medium includes any mechanism for storing or transmitting information in a form readable by a machine (e.g., a computer). For example, a machine readable medium includes read only memory ("ROM"); random access memory ("RAM"); magnetic disk storage media; optical storage media; flash memory devices; etc.

An article of manufacture may be used to store program code. An article of manufacture that stores program code may be embodied as, but is not limited to, one or more memories (e.g., one or more flash memories, random access memories (static, dynamic or other)), optical disks, CD-ROMs, DVD ROMs, EPROMs, EEPROMs, magnetic or optical cards or other type of machine-readable media suitable for storing electronic instructions. Program code may also be downloaded from a remote computer (e.g., a server) to a requesting computer (e.g., a client) by way of data signals embodied in a propagation medium (e.g., via a communication link (e.g., a network connection)).

The preceding detailed descriptions are presented in terms of algorithms and symbolic representations of operations on data bits within a computer memory. These algorithmic descriptions and representations are the tools used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be kept in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "computing," "selecting," "presenting," "determining," "associating," "routing," "storing," "receiving," "creating," "relating", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The processes and displays presented herein are not inherently related to any particular computer or other apparatus. Various general-purpose systems may be used with programs in accordance with the teachings herein, or it may prove convenient to construct a more specialized apparatus to perform the operations described. The required structure for a variety of these systems will be evident from the description below. In addition, the present invention is not described with reference to any particular programming language. It will be appreciated that a variety of programming languages may be used to implement the teachings of the invention as described herein.

The foregoing discussion merely describes some exemplary embodiments of the present invention. One skilled in the art will readily recognize from such discussion, the accompanying drawings and the claims that various modifications can be made without departing from the spirit and scope of the invention.

What is claimed is:

1. A non-transitory machine-readable medium having executable instructions to cause one or more processing units to perform a method comprising:
receiving a first group of messages and a second group of messages, wherein each of the messages in the first and second group of messages includes a plurality of message addresses;
selecting a related message from the second group of messages that is related to each message in the first group of messages, wherein the selecting is based on an affinity group of message addresses, the affinity group includes message addresses representing entities that communicate with each other for a particular common purpose, the affinity group is determined using the plurality of message addresses contained in the first and second groups of messages, and the selecting the related message includes, computing the affinity group using a probability that the one of the message addresses appears in a message in the first and second group of messages with another message address, and computing a message signature with the affinity group; and generating data to present the related message.

2. The non-transitory machine-readable medium of claim 1, wherein the affinity group is a group of message addresses that are related to each other.

3. The non-transitory machine-readable medium of claim 1, wherein a message is of a type selected from the group consisting of email, Short Message Service, Multimedia Message Service, Enhanced Message Service, TWITTER, FACEBOOK, telephone message log, and instant messaging.

4. The non-transitory machine-readable medium of claim 3, wherein the first and second group of messages includes a plurality of message types.

5. The non-transitory machine-readable medium of claim 1, wherein the selecting comprises:

computing the message signature for each message in the first and second group of messages.

6. The non-transitory machine-readable medium of claim 5, wherein the message signature for a message is a distance vector between the affinity group and a plurality of addresses associated with that message.

7. The non-transitory machine-readable medium of claim 5, wherein the selecting further comprises:

computing a similarity value between the message signature of a message in the first group and the message signature of a message in the second group to result in a plurality of similarity values; and determining the related message from the plurality of similarity values.

8. The non-transitory machine-readable medium of claim 1, wherein the entities communicate above a minimum frequency regarding the particular common purpose.

9. A non-transitory machine-readable medium having executable instructions to cause one or more processing units to perform a method comprising:

receiving a first group of messages and a second group of messages, wherein each of the messages in the first and second group of messages includes a plurality of message addresses;

selecting a related message from the second group of messages that is related to each message in the first group of messages, wherein the selecting is based on an affinity group of message addresses, the affinity group includes a message address that occurs in at least one of the messages in the second group, the affinity group is determined using the plurality of message addresses contained in the first and second groups of messages, and the selecting the related message includes, computing the affinity group using a probability that the one of the message addresses appears in a message in the first and second group of messages with another message address, and computing a message signature with the affinity group; and generating data to present the related message.

10. The non-transitory machine-readable medium of claim 9, wherein the affinity group is a group of message addresses that are related to each other.

11. The non-transitory machine-readable medium of claim 9, wherein the first and second group of messages includes a plurality of message types.

12. The non-transitory machine-readable medium of claim 9, wherein the selecting comprises:

computing the message signature for each message in the first and second group of messages.

13. The non-transitory machine-readable medium of claim 12, wherein the message signature for a message is a distance vector between the affinity group and a plurality of addresses associated with that message.

14. The non-transitory machine-readable medium of claim 12, wherein the selecting further comprises:

computing a similarity value between the message signature of a message in the first group and the message signature of a message in the second group to result in a plurality of similarity values; and determining the related message from the plurality of similarity values.

15. An apparatus comprising: a processor;

a memory coupled to the processor though a bus; and a process executed from the memory by the processor that causes the processor to receive a first group of messages and a second group of messages, wherein each of the messages in the first and second group of messages includes a plurality of message addresses, select a related message from the second group of messages that is related to each message in the first group of messages, wherein the selecting is based on an affinity group of message addresses, the affinity group includes a message address that occurs in at least one of the messages in the second group and the affinity group is determined using the plurality of message addresses contained in the first and second groups of messages, and the process further causes the processor to select the related message by, computing the affinity group using a probability that the one of the message addresses appears in a message in the first and second group of messages with another message address, and computing a message signature with the affinity groups, and generate data to present the related message.

16. The apparatus of claim 15, wherein the affinity group is a group of message addresses that are related to each other.

17. The apparatus of claim 15, wherein the first and second group of messages includes a plurality of message types.

18. The apparatus of claim 15, wherein the process further causes the processor to select the related message by:

computing message signature for each message in the first and second group of messages.

19. The apparatus of claim 18, wherein the message signature for a message is a distance vector between the affinity group and a plurality of addresses associated with that message.

20. The apparatus of claim 15, wherein the process further causes the processor to select the related message by:

computing a similarity value between the message signature of a message in the first group and the message signature of a message in the second group to result in a plurality of similarity values; and determining the related message from the plurality of similarity values.

* * * * *